US012380768B2

(12) United States Patent
Johnson

(10) Patent No.: US 12,380,768 B2
(45) **Date of Patent: *Aug. 5, 2025**

(54) SEAMLESS INITIATION OF PRIMARY AND SECONDARY GAMES AT MODIFIED GAMING MACHINES

(71) Applicant: Fortuna IP, LLC, Allen, TX (US)

(72) Inventor: Sam Johnson, Largo, FL (US)

(73) Assignee: FORTUNA IP, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,993

(22) Filed: Dec. 1, 2023

(65) Prior Publication Data

US 2024/0177566 A1 May 30, 2024

Related U.S. Application Data

(63) Continuation of application No. 17/837,391, filed on Jun. 10, 2022, now Pat. No. 11,847,891, which is a (Continued)

(51) Int. Cl.

*G07F 17/32* (2006.01)
*G06Q 50/34* (2012.01)
*G07F 17/34* (2006.01)

(52) U.S. Cl.

CPC ......... *G07F 17/3258* (2013.01); *G06Q 50/34* (2013.01); *G07F 17/3211* (2013.01);

(Continued)

(58) Field of Classification Search

None

See application file for complete search history.

(56) References Cited

U.S. PATENT DOCUMENTS

| | | | |
|---|---|---|---|
| 5,830,067 | A | 11/1998 | Graves et al. |
| 6,379,246 | B1 | 4/2002 | Dabrowski |

(Continued)

FOREIGN PATENT DOCUMENTS

| | | |
|---|---|---|
| EP | 1857987 | 11/2007 |
| WO | 2014047028 | 3/2014 |

OTHER PUBLICATIONS

International Search Report for PCT/US2013/060049, mailed Dec. 20, 2013, 4 pages.

(Continued)

*Primary Examiner* — Omkar A Deodhar

(74) *Attorney, Agent, or Firm* — Ascenda Law Group, PC

(57) ABSTRACT

Secondary gaming functionality is provided for a casino gaming machine (26) by a secondary controller (200) of the casino gaming machine. The secondary gaming functionality may function to provide a multi-game experience at the gaming machine or remotely at another gaming machine or other device, e.g., a smart phone (28), tablet, personal computer (32), and the like, via the casino gaming machine. The multi-game experience may comprise one or more secondary wager-based games in addition to the one or more primary wager-based game(s) provided by the primary gaming functionality of the gaming machine. The secondary controller functionality may cause the secondary wager-based game to be presented upon a single input player to the gaming machine which also initiates the primary game, whereby primary and secondary games are initiated seamlessly to the player via a single input.

16 Claims, 8 Drawing Sheets

Related U.S. Application Data continuation of application No. 17/074,080, filed on Oct. 19, 2020, now Pat. No. 11,361,620, which is a continuation of application No. 16/424,844, filed on May 29, 2019, now Pat. No. 10,810,839, which is a continuation of application No. 15/984,773, filed on May 21, 2018, now Pat. No. 10,319,191, which is a continuation of application No. 15/343,363, filed on Nov. 4, 2016, now abandoned, which is a continuation of application No. 14/660,257, filed on Mar. 17, 2015, now Pat. No. 9,495,836, which is a continuation of application No. PCT/US2013/060049, filed on Sep. 17, 2013, which is a continuation-in-part of application No. 13/799,356, filed on Mar. 13, 2013, now Pat. No. 8,900,057, which is a continuation-in-part of application No. 13/622,150, filed on Sep. 18, 2012, now Pat. No. 10,002,492.

(52) U.S. Cl.
CPC ...... *G07F 17/3223* (2013.01); *G07F 17/3225* (2013.01); *G07F 17/3227* (2013.01); *G07F 17/326* (2013.01); *G07F 17/3262* (2013.01); *G07F 17/3267* (2013.01); *G07F 17/3272* (2013.01); *G07F 17/3288* (2013.01); *G07F 17/329* (2013.01); *G07F 17/3293* (2013.01); *G07F 17/34* (2013.01)

(56) References Cited

U.S. PATENT DOCUMENTS

| | | | | |
|---|---|---|---|---|
| 7,335,106 | B2 | 2/2008 | Johnson | |
| 7,753,767 | B2 | 7/2010 | Thomas | |
| 8,075,388 | B1 | 12/2011 | Bennett | |
| 8,083,592 | B2 * | 12/2011 | Wells | G07F 9/026 463/24 |
| 8,187,095 | B2 | 5/2012 | Wong et al. | |
| 8,282,489 | B2 | 10/2012 | Arezina et al. | |
| 8,529,328 | B2 | 9/2013 | Tarantino | |
| 8,529,342 | B2 | 9/2013 | Tarantino | |
| 8,721,449 | B2 | 5/2014 | Johnson | |
| 8,900,057 | B2 | 12/2014 | Johnson | |
| 8,932,130 | B2 | 1/2015 | Tarantino | |
| 9,064,375 | B2 | 6/2015 | Johnson | |
| 9,378,622 | B2 | 6/2016 | Tarantino | |
| 9,564,004 | B2 | 2/2017 | Johnson | |
| 9,619,964 | B2 | 4/2017 | Tarantino | |
| 2002/0123376 | A1 | 9/2002 | Walker et al. | |
| 2003/0087687 | A1 | 5/2003 | Locke | |
| 2004/0043814 | A1 | 3/2004 | Angell et al. | |
| 2006/0025192 | A1 | 2/2006 | Walker | |
| 2006/0040743 | A1 | 2/2006 | Saffari et al. | |
| 2006/0135255 | A1 | 6/2006 | Johnson | |
| 2006/0205492 | A1 | 9/2006 | Linard et al. | |
| 2007/0004519 | A1 | 1/2007 | Swart et al. | |
| 2007/0021198 | A1 | 1/2007 | Muir et al. | |
| 2007/0077997 | A1 | 4/2007 | Johnson | |
| 2007/0155469 | A1 | 7/2007 | Johnson | |
| 2007/0207850 | A1 | 9/2007 | Darrah et al. | |
| 2008/0113773 | A1 | 5/2008 | Johnson | |
| 2008/0113802 | A1 | 5/2008 | Johnson | |
| 2008/0119253 | A1 | 5/2008 | Ryan et al. | |
| 2008/0161107 | A1 | 7/2008 | Johnson | |
| 2008/0300057 | A1 | 12/2008 | Kido | |
| 2009/0061975 | A1 | 3/2009 | Ditchev | |
| 2009/0247267 | A1 | 10/2009 | Acres | |
| 2010/0004055 | A1 | 1/2010 | Gormley et al. | |
| 2011/0028203 | A1 | 2/2011 | Agarwal et al. | |
| 2011/0195786 | A1 * | 8/2011 | Wells | G07F 9/026 463/47 |
| 2011/0221745 | A1 | 9/2011 | Goldman et al. | |
| 2011/0287828 | A1 | 11/2011 | Anderson et al. | |
| 2012/0329549 | A1 | 12/2012 | Johnson | |
| 2013/0165210 | A1 | 6/2013 | Nelson | |
| 2014/0080562 | A1 | 3/2014 | Johnson | |

OTHER PUBLICATIONS

International Preliminary Report on Patentability for PCT/US2013/060049, mailed Mar. 24, 2015, 8 pages.
International Search Report for PCT/US13/059947; mailed Dec. 13, 2013; 13 pages.
USPTO; OA U.S. Appl. No. 14/660,257; mailed Jan. 21, 2016; 12 pages.
USPTO; OA U.S. Appl. No. 13/799,356; mailed Jul. 18, 2014; 6 pages.
USPTO; OA U.S. Appl. No. 13/622,150; mailed Oct. 26, 2015; 14 pages.
USPTO; OA U.S. Appl. No. 13/622,150; mailed Jun. 6, 2016; 19 pages.
USPTO; NoA U.S. Appl. No. 13/622,150; mailed Mar. 9, 2018; 7 pages.
USPTO; OA U.S. Appl. No. 13/622,150; mailed Mar. 11, 2015; 12 pages.
USPTO; OA U.S. Appl. No. 13/622,150; mailed Jan. 11, 2017; 21 pages.
USPTO; NoA U.S. Appl. No. 14/660,257; mailed Oct. 18, 2016; 5 pages.
USPTO; NoA U.S. Appl. No. 13/799,356; mailed Oct. 14, 2014; 5 pages.
USPTO; NoA U.S. Appl. No. 13/799,356; mailed Jan. 24, 2015; 5 pages.
USPTO; OA U.S. Appl. No. 15/271,208; mailed Mar. 27, 2018; 26 pages.
USPTO; OA U.S. Appl. No. 15/271,208; mailed Oct. 2, 2018; 21 pages.
USPTO; OA U.S. Appl. No. 15/139,510; mailed Sep. 20, 2018; 28 pages.
USPTO; OA U.S. Appl. No. 15/139,510; mailed Mar. 9, 2018; 18 pages.
USPTO; OA U.S. Appl. No. 15/151,120; mailed Mar. 9, 2018; 19 pages.
USPTO; OA U.S. Appl. No. 15/151,120; mailed Oct. 3, 2018; 16 pages.
USPTO; OA U.S. Appl. No. 15/343,363; mailed Mar. 29, 2017; 9 pages.
USPTO; NoA U.S. Appl. No. 15/343,363; mailed Feb. 21, 2018; 5 pages.
USPTO; OA U.S. Appl. No. 15/984,773; mailed Sep. 14, 2018; 10 pages.
USPTO; NoA U.S. Appl. No. 15/271,208; mailed Nov. 25, 2018; 9 pages.
USPTO; NoA U.S. Appl. No. 15/139,510; mailed Apr. 9, 2018; 16 pages.
USPTO; OA U.S. Appl. No. 16/423,338; mailed Mar. 18, 2020; 6 pages.
USPTO; NoA U.S. Appl. No. 16/423,338; mailed Aug. 10, 2020; 8 pages.
USPTO; OA U.S. Appl. No. 16/424,844; mailed Apr. 24, 2020; 5 pages.
USPTO; NoA U.S. Appl. No. 16/424,844; mailed Aug. 31, 2020; 5 pages.
USPTO; NoA U.S. Appl. No. 15/984,773; mailed Feb. 4, 2019; 5 pages.
USTPO; OA U.S. Appl. No. 15/139,510; mailed Mar. 9, 2018; 13 pages.
USPTO; OA U.S. Appl. No. 15/271,208; mailed May 29, 2019; 13 pages.
USPTO; OA U.S. Appl. No. 15/151,120; May 29, 2019; 13 pages.
USPTO; NoA U.S. Appl. No. 15/151,120; mailed Nov. 25, 2019; 9 pages.
USPTO; OA U.S. Appl. No. 16/838,862; mailed Jun. 3, 2021; 27 pages.

(56) References Cited

OTHER PUBLICATIONS

USPTO; NoA U.S. Appl. No. 16/838,862; mailed Sep. 21, 2021; 8 pages.
USPTO; NoA U.S. Appl. No. 17/077,202; mailed Mar. 21, 2022; 8 pages.
USPTO; NoA U.S. Appl. No. 17/074,080; mailed Feb. 18, 2022; 5 pages.
USPTO; NoA U.S. Appl. No. 17/587,858; mailed Mar. 24, 2023; 8 pages.
USPTO; NoA U.S. Appl. No. 17/837,391; mailed Aug. 8, 2023; 8 pages.

* cited by examiner

SEAMLESS INITIATION OF PRIMARY AND SECONDARY GAMES AT MODIFIED GAMING MACHINES

RELATED APPLICATION DATA

This application is a continuation of U.S. application Ser. No. 17/837,391, filed Jun. 10, 2022, which is a continuation of U.S. application Ser. No. 17/074,080, filed Oct. 19, 2020, now U.S. Pat. No. 11,361,620, which is a continuation of U.S. application Ser. No. 16/424,844, filed May 29, 2019, now U.S. Pat. No. 10,810,839, which is a continuation of U.S. application Ser. No. 15/984,773, filed May 21, 2018, now U.S. Pat. No. 10,319,191, which is a continuation of U.S. application Ser. No. 15/343,363, filed Nov. 4, 2016, now abandoned, which is a continuation of U.S. application Ser. No. 14/660,257, filed Mar, 17, 2015, now U.S. Pat. No. 9,495,836, which is a continuation of PCT/US2013/60049, filed Sep. 17, 2013, which is a continuation of U.S. patent application Ser. No. 13/799,356, filed Mar. 13, 2013, now U.S. Pat. No. 8,900,057, which is a continuation-in-part of U.S. patent application Ser. No. 13/622,150, filed Sep. 18, 2012, now U.S. Pat. No. 10,002,492.

FIELD OF THE INVENTION

The present invention relates to casino-style gaming machines.

BACKGROUND OF THE INVENTION

Wager-based gaming continues to grow in popularity. In order to attract players, casinos and gaming device manufacturers continuously seek to develop new ways to make the experience more entertaining. In this regard, gaming device manufacturers develop and release hundreds of new wagering games each year, and new gaming machines may present entirely new games or may present old games using new entertaining themes. These and other traditional gaming machines are custom created to have specific functionality. As a result, casinos have to either buy new machines or have existing machines reprogrammed to upgrade the machines with new features. Each alternative is expensive. Furthermore, these traditional gaming machines are limited to a finite set of features, even after being upgraded or reprogrammed.

It would be beneficial for gaming device manufacturers and casinos to have a more economical way to provide new games and other gaming device features.

SUMMARY OF THE INVENTION

Secondary gaming functionality is provided for a casino gaming machine by a secondary controller which is associated with the casino gaming machine. The secondary gaming functionality may function to provide a multi-game experience at the gaming machine or remotely at another gaming machine or other device, e.g., a smart phone, tablet, personal computer, and the like. The multi-game experience may comprise one or more additional or "secondary" wager-based games in addition to the primary wager-based game(s) provided by the primary gaming functionality of the gaming machine. The one or more secondary wager-based games may be entirely different from, and/or unrelated to, the wager-based games provided by the primary gaming functionality of the gaming machine. The secondary gaming functionality of the gaming machine may cause the one or more additional wager-based games to be presented at another device either directly or indirectly via a server, such as a social media server or a server-based gaming system's server.

In accordance with one or more embodiments, a modified gaming machine comprises a plurality of gaming machine peripheral devices including at least one video display and at least one player input device, a main game controller and a secondary controller. The main game controller is configured to implement base or primary gaming functionality, and is configured to generate and transmit information to the plurality of gaming machine peripheral devices. The secondary controller is preferably interposed between one or more of the plurality of gaming machine peripheral devices and the main game controller. The secondary controller may forward information generated by the main gaming controller to one or more of the plurality of gaming machine peripheral devices and transmit secondary information to one or more of the peripheral devices (or, as detailed below, one or more secondary devices). In response to receiving a secondary gaming functionality request input via at least one of the plurality of gaming machine peripheral devices, the secondary controller causes secondary gaming functionality to be generated/presented (at the gaming machine or elsewhere, as detailed below) in addition to the primary gaming functionality provided by the main game controller.

In accordance with one or more embodiments, the primary gaming functionality provides a primary instance of a wager-based game and the secondary gaming functionality may provide at least one secondary instance of a wager-based game, which is provided in addition to the primary wager-based game. By way of a non-limiting example, each of the primary and second instances might be an instance of any type of wager-based game, including without limitation a wager-based poker game, slot game, keno, lottery-type game, etc. In accordance with one or more embodiments, the primary gaming functionality provides a primary wager-based game and the secondary gaming functionality provides one or more secondary wager-based games, which secondary games might be entirely different and/or unrelated to the primary game provided by the primary gaming functionality.

In accordance with one or more embodiments, the secondary gaming functionality may be invoked and provide one or more additional, secondary game instances in response to an operation initiated by a player, and most preferably, in response to the player's initiation of a primary game. As discussed herein, each additional, secondary game instance is a wager-based game, e.g., as a wager-based game from an external source, such as a game provider or publisher. The secondary gaming instance(s) may be invoked in response to any type of input by the user indicating a desire to access a multi-game experience. By way of some non-limiting examples, a secondary instance may be selected from a menu or sub-window provided by the secondary gaming functionality provided by the secondary controller.

In accordance with one or more embodiments, the primary gaming functionality may provide a primary slot game and the secondary gaming functionality may provide at least one additional instance of the slot game. Alternatively, the primary gaming functionality may provide a first wager-based game, e.g., a slot game, while the secondary instance provided by the secondary gaming functionality may be a second wager-based game different from the first wager-based game, e.g., a poker game. As yet another non-limiting example, the primary gaming functionality may provide a primary poker hand and the secondary gaming functionality may provide at least one additional poker hand; the additional poker hand may, but need not, use a card, or cards, from the primary poker hand.

In accordance with one or more embodiments, the primary gaming functionality may provide a primary instance of a legacy wager-based game and, in response to input indicating a player's desire for a multi-game experience, the secondary gaming functionality may provide at least one secondary instance of an externally-sourced wager-based game provided in addition to the primary instance. The secondary instance might be selected from a menu or sub-window displayed by the secondary controller in response to selection of a button or other user interface component by the player. In accordance with one or more embodiments, once a secondary game is selected the secondary controller monitors input from the player, e.g., watches for the player to make a "bet" to play one of the legacy games on the machine. Where the secondary controller detects a triggering input, e.g., "bet" or "wager" input, by the player, the secondary controller causes the secondary game instance to start or be presented. In accordance with one or more embodiments, the secondary controller causes the secondary game instance to start or be presented at a same time as the primary game is started or presented, in response to the single input by the player to the gaming machine.

The at least one secondary wager-based game may be provided at the modified gaming machine and/or it may be provided to an external device via an external server, such as a social media server or a gaming system server. Where the external server is a social media server, the secondary instances of the wager-based game may be presented to a player's social media friends. Where the external server is a gaming system server, the at least one secondary instance of a wager-based game may be provided via the gaming system server. In accordance with one or more embodiments, the secondary controller may cause at least one secondary instance of a wager-based game to be provided via another modified gaming machine or another device.

Further objects. features, and advantages of the present invention over the prior art will become apparent from the detailed description of the drawings which follows, when considered with the attached figures.

DETAILED DESCRIPTION OF THE INVENTION

Figure 1:
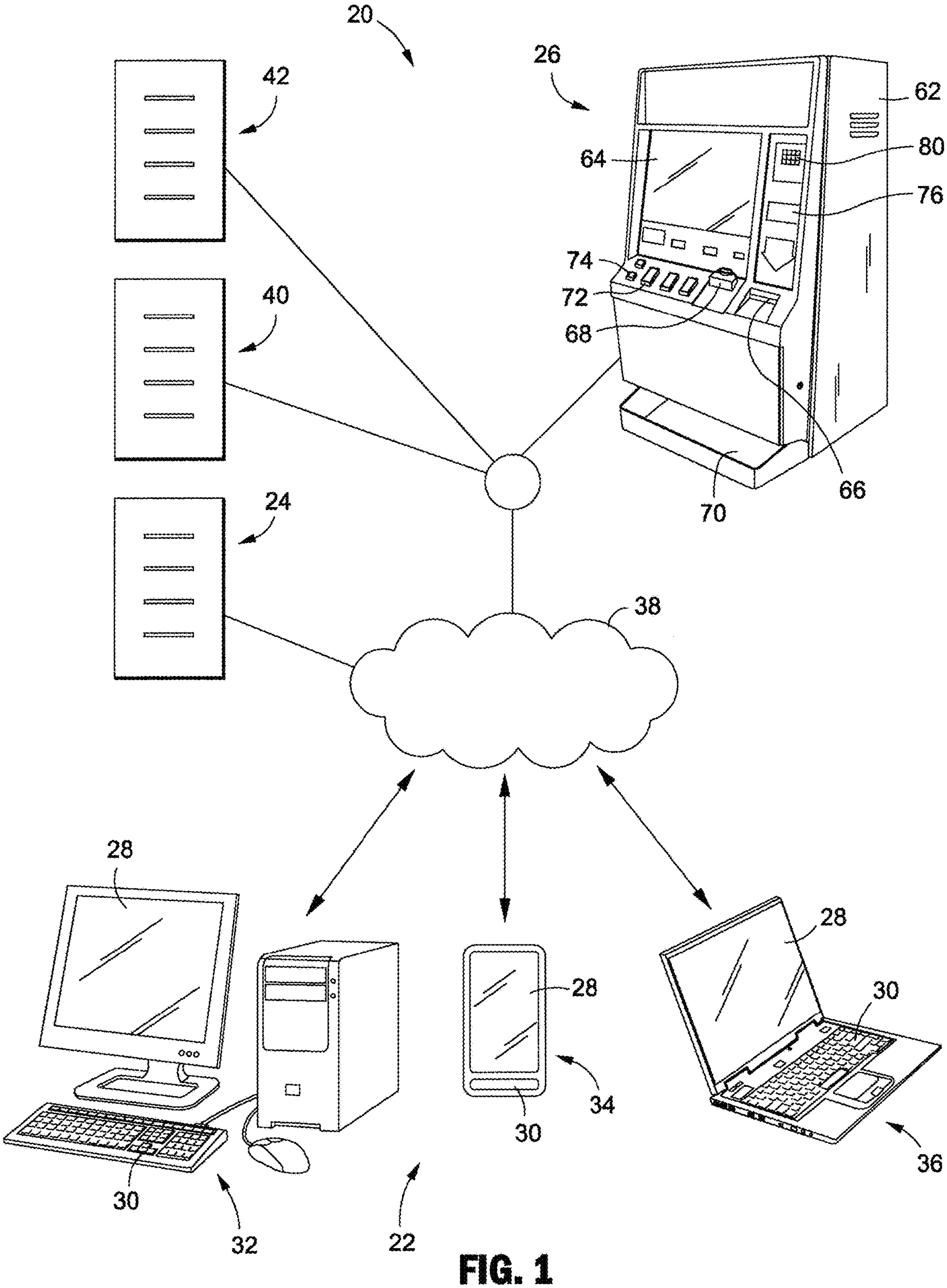
FIG. 1 diagrammatically illustrates a gaming system including one or more presentation devices and at least one casino gaming machines.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In accordance with one or more embodiments of the invention, a modified gaming machine is provided, which gaming machine comprises a primary master gaming controller that provides at least one primary instance of a wager-based game, such as without limitation wager-based poker (such as wherein a combination of playing cards are evaluated for winning outcomes, such as winning hands), slot (such as wherein displayed symbols are evaluate for winning outcomes, such as for winning combinations along one or more pay lines), keno, lottery-type, etc. games, and a secondary controller configured to provide a number of additional, secondary wager-based game instances. In accordance with one or more embodiments, a primary game instance is a primary, main or legacy game, provided by the primary functionality of the gaming machine, and each additional, secondary game is a wager-based game of one or more game publishers such as without limitation a publisher of a web-based and/or mobile application wager-based game, which is/are presented at the gaming machine by the secondary functionality of the gaming machine. In accordance with one or more embodiments: (1) each secondary game is selectable for play at the gaming machine by a player; (2) each primary game, or primary game instance, and each secondary game, or secondary game instance, selected by the user may be displayed at the gaming machine; (3) a single bet input may be used to place a bet for all of the primary and secondary game instances; and/or (4) a single input by the player, such as a single activation of a bet button at the gaming machine, initiates both the primary game instance and one or more secondary game instances. In a preferred embodiment of the invention, at least one secondary game is initiated when a player provides an input to a gaming machine to initiate a primary game. For example, when a player pulls a "spin" arm, presses a "spin" button, presses a "deal" button or provides other input to a gaming machine which is used to initiate a primary game at the gaming machine, at least one secondary game is initiated based upon that same/single input.

In one embodiment, the primary and secondary games may be wagering games and have the same or different types of wagers/credits/points associated therewith. By way of a non-limiting example, wagering/credits might be tracked separately such that the gaming machine might track the wagers/credits for each primary game instance, and the secondary controller might track wagers/credits for each secondary game. Alternatively, the secondary controller might track wagers/credits for each primary and secondary game instance. Different types of credits may be used relative to the primary and secondary game instances such as monetary credits relative to a primary game instance and monetary credits or secondary points relative to the secondary game instances.

In accordance with one or more such embodiments, the secondary game instances may be provided together with the primary game instance(s) at the modified gaming machine and/or via the modified gaming machine to another device, such as at a player's computing device that is communicatively linked, e.g., via one or more networks and networked server computers, with the modified gaming machine. In accordance with one or more embodiments, the gaming instances may be provided at a player's computing device, e.g., via at least one social media system server or a server-based gaming system. The secondary controller may be communicatively coupled, via one or more networks, to one or more servers, so as to provide instances of the modified gaming machine's wager-based game to another gaming machine, e.g., another modified gaming machine, or any computing device to which the secondary controller is able to communicate via the network(s) and server(s).

The modified gaming machine gives the user, or player, the ability to play games that the gaming machine's master gaming controller is not configured to present, and to play both games which the gaming machine was designed to present and such other games which it was not designed to present, at the same time and in response to a single input at the gaming machine.

In accordance with one or more embodiments, the modified gaming machine comprising the secondary controller provides the player with a multi-game experience, which would not otherwise be available with an unmodified traditional or legacy gaming machine, i.e., a gaming machine that lacks the secondary controller.

Reference is now made to FIG. 1, which illustrates a system which may include a modified gaming machine and one or more presentation devices, among other components. As is discussed further below, a presentation device may be a player's computing device, which may be located in a remote location with respect to the modified gaming machine.

As illustrated in FIG. 1, in one embodiment, a system 20 may comprise one or more presentation devices 22 (it being understood that while there may be two or more presentation devices 22, for convenience herein, the system is primarily described relative to a player's use of a "presentation device 22") and at least one casino gaming machine 26.

The presentation device 22 may be a dedicated/special purpose device or may be a general purpose device. The presentation device 22 is preferably an electronic device, and more preferably a computing device. The presentation device 22 may include at least one display 28 capable of displaying game information, at least one player input device 30, and at least one communication interface.

The presentation device 22 might comprise, for example, a desktop computer 32, a telephone (including cellular, wireless or wired telephones) or PDA 34 (such as an iPhone®), a laptop or notebook computer 36, or various other devices. As indicated, the presentation device 22 might also comprise a special purpose device such as a specially configured gaming tablet.

The player input device 30 might comprise, for example, a keyboard, mouse, joystick, touch-screen, button(s), trackballs or other devices now known or later configured and which are capable of receiving input from a player. The communication interface is preferably configured to permit information or data to be exchanged from one or more remote device or locations with the presentation device 22. The one or more communication interface might support wired or wireless communications using various protocols. For example, if the presentation device 22 is a PDA, the communications might be by 3G, 4G, IMT, GSM or the like. If the presentation device 22 is a desktop computer, the communications might be by TCP/IP or the like. Of course, other protocols may be used such as Bluetooth, 802.11xx and the like.

It will be appreciated that the presentation device 22 may include other components. For example, the presentation device 22 may include a main processor, a video and/or audio processor, input and output ports or the like.

As indicated above, the system 20 preferably also includes one or more gaming machines 26. In a preferred embodiment, the gaming machines 26 are traditional or legacy casino-style gaming machines which are located at a casino (and as such are referred to as "casino gaming machines"). As described below, the casino gaming machines 26 may be part of a gaming system, such as a casino gaming system which links multiple of the gaming machines, one or more table games and other devices such as kiosks, accounting systems or servers, progressive systems or servers, player tracking systems or servers or the like.

Such traditional or legacy casino-style gaming machines 26 may have a plurality of features. For example, such a traditional casino gaming machine 26 may include a housing or cabinet 62 for enclosing/supporting various components of the gaming machine. The housing 62 may have a variety of configurations. In one embodiment, as illustrated, the housing 62 is configured so that the machine has an "upright" configuration. The casino gaming machine 26 might also be configured as a "slant"-type, "bar-top" or have other forms.

In one embodiment, the casino gaming machine 26 may be configured as a "video" type gaming machine, the machine including at least one display 64 for displaying game information to a player. The casino gaming machine 26 may include other means for providing information to a player. For example, speakers (not shown) or other devices may be provided for generating sound associated with the game. The casino gaming machine 26 may also include lights, printed instructions and other displays/display devices.

The games presented by the gaming machine(s) may be wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the casino gaming machine 26 thus includes a bill validator/acceptor 66 for accepting paper currency and a coin acceptor 68 for accepting coins. Other means of payment, such as a credit card reader, may be provided. An award of winnings in the form of coins may be paid to the player via a coin tray 70.

Preferably, the casino gaming machine 26 includes means for a player to provide input. In one embodiment, this means comprises one or more buttons. For example, a "spin" button 72 may be provided for permitting a player to start a game. One or more wager buttons 74 may be provided for a player to select the amount to bet on a particular game. Other means of input may be provided, such as a touch-screen display and other devices now known or later developed.

A main game controller (not shown) is provided for controlling the various devices of the gaming machine and for generating game information. The main game controller may comprise a processor which is configured to execute machine readable code or "software", which software may, for example, be stored at one or more associated memory devices (such as a hard driver, EEPROM, RAM or other data storage devices now known or later developed). For example, the game controller may be arranged to generate video and audio data for presentation by the display and speakers of the casino gaming machine 26. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 70 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game, or games (e.g., in a case of a multi-game experience according to one or more embodiments described herein).

The casino gaming machine 26 may include one or more random number generators for generating random game events and results. In other embodiments, game results or information may be generated remotely (such as by a remote game server) and be transmitted to the gaming machine 26. It will be appreciated that the gaming machine 26 may be configured to present a wide variety of games which are now known or later developed, including card games such as poker and blackjack games, slot-type games, lottery-type games, bingo games, keno games, sports wagering and other events or games.

As indicated, in one embodiment, game information is displayed by a video display 64 to a player. That display may be of a variety of types, including CRT, LCD, plasma and others. The gaming machine 26 may also include more than one video display.

In another embodiment, the casino gaming machine 26 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression of a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

So configured, the existing traditional or legacy casino gaming machine 26 is configured to present one or more primary games or primary game instances. Primary game instances may be initiated by player input to a spin button, deal button or a wager button.

Such casino gaming machines 26 may have other configurations, including other features. For example, the casino gaming machine 26 may include a player tracking device, such as a card reader 76 and associated keypad 80. Such player tracking devices are well known and may permit the game operator to track play of players of the gaming machine. The tracked play may be utilized to offer player bonuses or awards.

In one embodiment, the casino gaming machine 26 may be configured to dispense media, such as printed paper tickets, which have associated value. For example, winnings or unused credits may be returned to the player via a printed ticket having value or associated value. In one embodiment, the casino gaming machine 26 might also be configured to accept such media for providing credit for game play. Relative to such casino gaming machines 26, an accounting server 40 may be used to generate ticket information to permit the gaming machine to dispense a value cash-out ticket, or to verify such a ticket which is presented at one of the casino gaming machines 26. Such systems are well known and thus not described in detail herein.

A casino may have numerous such casino gaming machines 26, such as located on a casino floor or in other locations. Of course, such casino gaming machines 26 might be used in other environments, such as an airport, a bar or tavern or other locations.

As used herein, the term "casino gaming machine" may include other types of gaming machines or device. Such might comprise, for example, gaming tables. Such tables may be manually operated or be fully or partially automated. A variety of games may be offered at such tables. Of course, the gaming machines may include other types of devices as well.

In a preferred embodiment, the invention has particular utility to gaming machines which include at least one player interface via which information may be presented or displayed to the player. Such an interface preferably comprises at least one electronic video display. Such a display might comprise, for example, a display of a gaming machine 26 such as described above, or such might comprise a display located at a gaming table or other device (including a display not originally associated with the original gaming machine).

As indicated above and as illustrated in FIG. 1, the system 20 of the invention may further comprise other systems and components. In one embodiment, the system 20 may further comprise the above-referenced accounting server/system 40 and/or a player tracking server/system 42 or the like.

The accounting server 40 may track monetary transactions, including information regarding monetary value provided by a player, amounts wagered by a player and amounts won by a player, such as described in more detail below. The accounting server 40 may a computing device which has a processor for executing instructions, a memory for storing data such as instructions and monetary value information, and at least one communication interface. The accounting server 40 may comprise one device or a number of devices which are in communication with one another at one or more times. For example, the accounting server 40 may communicate with an external data storage device. Additional details regarding the account server 40 are described below.

The player tracking server 42 may be configured to store player identity information and information regarding the player's gaming or other activities, as is well known. The player tracking server 42 may a computing device which has a processor for executing instructions, a memory for storing data such as instructions and monetary value information, and at least one communication interface. The player tracking server 42 may comprise one device or a number of devices which are in communication with one another at one or more times. For example, the player tracking server 42 may communicate with an external data storage device. Additional details regarding the player tracking server 42 are described below.

In one embodiment, various features of the invention may be implemented or facilitated by one or more secondary servers or other devices. For example, although not illustrated in FIG. 1, a casino might operate one or more casino or secondary game servers 24. Such a server may serve as a bridge to facilitate the features of the invention.

In a preferred embodiment, a casino gaming machine 26 is modified to implement the features of the invention. Currently there are tens of thousands of existing casino gaming machines 26 which were custom-created to present specific games—e.g. the main controllers and associated software were designed to present one or more specified games. These gaming machines were not designed to permit new games or other content or features to be presented by the machine without essentially re-programming the entire gaming machine (which is generally undesirably expensive and/or effectively prohibitive, at least in part because such re-programming is generally not permissible without gaming regulatory approval and oversight, i.e. the manufacturer or operator of the machine cannot simply unilaterally install new software on the gaming machine). Such gaming machines are often referred to as "legacy" gaming machines.

In one embodiment, legacy gaming machines may be modified to implement the present invention. In a preferred embodiment of the invention, an existing gaming machine is retro-fit with a secondary controller. One embodiment of such a configuration is illustrated in FIG. 7.

Figure 7:
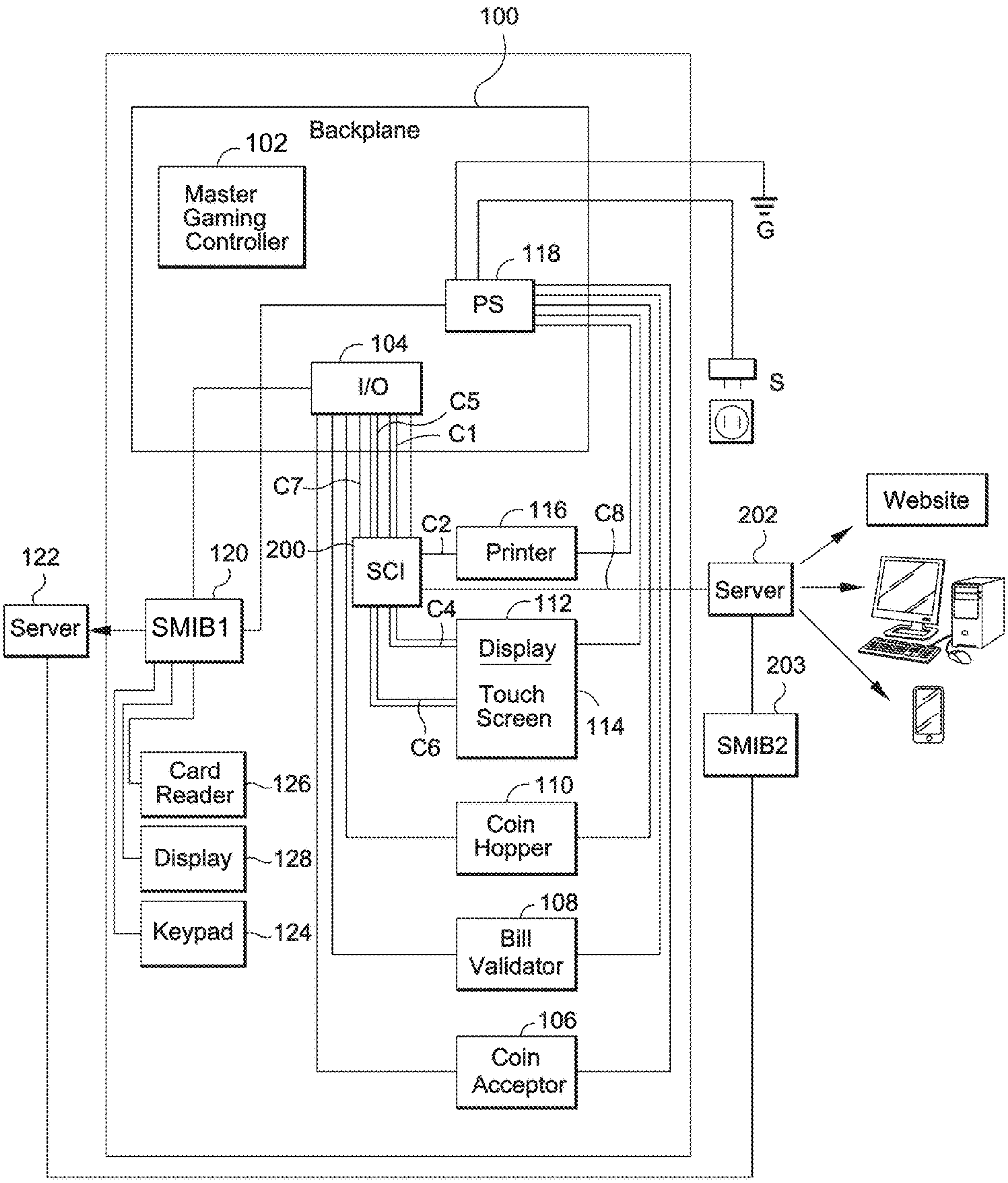
FIG. 7 diagrammatically illustrates one configuration of a casino gaming machine having a secondary interface for facilitating features of the invention.

As illustrated in FIG. 7, in one embodiment a legacy casino gaming machine has a backplane 100 which supports a main or master gaming controller 102. The master gaming controller 102 may comprise a computer processing unit and may include one or more associated components, such as memory devices or the like. In general, the master gaming controller 102 is configured to execute machine readable code for use in operating the gaming machine. For example, the master gaming controller 102 may generate signals used to control various components of the gaming machine and/or generate data for use by those components.

An input/output (I/O) board 104 is associated with the master gaming controller 102. The I/O board 104 may be part of the master gaming controller 102 or, as illustrated in FIG. 7, be connected to the backplane 100. The input/output board 104 may include various connectors or communication ports for use in connecting various components to the master gaming controller 102 (whereby the master gaming controller 102 may provide information, to the components, and/or receive information from those components). As used herein, the information or data may have any of a variety of forms now known or later developed, whether analog or digital, on/off, numeric, wave form or having any other configuration. The input/output board 104 may, for example, include one or more serial (such as RS-232), parallel, USB, Firewire® or other types of connections.

The gaming machine may include a variety of peripheral devices for use in presenting games to a player. For example, the gaming machine may include: a coin acceptor 106 for accepting coins for one or more wagers; a bill validator 108 for accepting paper currency, tickets or other printed documents representing value for one or more wagers; a coin hopper 110 for storing received coins and from which coin payouts may be paid; at least one display 112 for displaying game information, which display may have an associated touch screen 114 for receiving player touch input, and a printer 116 for printing tickets or other media. Of course, the gaming machine might have a wide variety of peripherals or other components, including buttons, rotatable arms, joysticks, trackballs, speakers and other devices.

As illustrated, each of these peripheral devices preferably communicates with the master gaming controller 102 via a communication connection through the I/O board 104 associated with the backplane 100. The particular connection might vary. For example, the printer 116 might be a USB-type device and thus interface with the I/O board 104 via a USB connection and associated port. The coin hopper 110, however, might be an RS-232 type device and connect to the I/O board 104 via a 9 pin connector. Preferably, the master gaming controller 102 can control these various peripheral devices via the communication connections therewith.

The various electrical or electro-mechanical devices of the gaming machine are powered. As illustrated, a power supply 118 may be associated with the backplane 100. The power supply 118 preferably connects to a ground G and an external power source S. The power supply 118 preferably provides power to the master gaming controller 102 and the various peripheral devices of the gaming machine, as illustrated. In one embodiment, the gaming machine may be configured to implement gaming machine accounting and player tracking functions. These operations may be facilitated by a Slot Machine Interface Board or "SMIB" 120. As illustrated, the SMIB 120 may connect to the master gaming controller 102 via the backplane 100, and may communicate with an external server 122 via a communication link. In one prior art configuration, the gaming machine may utilize a Slot Accounting Standard or "SAS" protocol in order to implement various gaming machine accounting functions (such as tracking of wagers, game wins and other information, as is known in the art). Due to the interface with the external server, the gaming machine accounting information may be obtained or tracked externally to the machine.

In addition, the gaming machine may include a player tracking feature. The player tracking feature may be implemented via components such as a keypad 124, a card reader 126 for reading cards or other media, other peripheral devices, such as a display 128. The player tracking devices or components may interface with the SMIB 120, and thus with the external server 122. In this manner, information regarding a particular player's play may be tracked. For example, a player may insert a player card having player identification information associated therewith, and that information may be provided to the server 122. Thereafter, game play information may be provided to the server 122, as known to be associated with the particular player identified by the provided identification information.

As just described, such an existing or "legacy" gaming machine is a fully integrated and pre-configured device for presenting one or more wagering games to a player. As indicated above, however, such a legacy gaming machine has a number of drawbacks owing to the specific configuration of the device.

In a preferred embodiment of the present invention, a secondary controller or interface (SCI) is provided which, when associated with a gaming machine, permits the gaming machine to provide additional or secondary functionality from its basic or pre-configured functionality. In one embodiment, the SCI is particularly suited to use with an existing gaming machine, including a gaming machine pre-configured in the manner illustrated in FIG. 1 and described above, or in a manner similar thereto.

The SCI, its method of use, its association with a gaming machine and system of the invention, will now be described first with reference to FIG. 7. For purposes of illustration, the SCI 200 is discussed in association with a gaming machine configured as illustrated in FIG. 1. Such a gaming machine may comprise an existing legacy machine having limited functionality.

The SCI 200 preferably comprises hardware, such as one or more circuit boards. The SCI 200 may comprise software, such as machine readable code. Such software, however, may be implemented as hardware.

In one embodiment, the SCI 200 is configured to communicate with one or more components of a gaming machine. As such, the SCI 200 includes one or more ports via which communication links may be established between the SCI 200 and those components. Referring to FIG. 7, in one embodiment, the SCI 200 is interposed between various components of the gaming machine and the I/O board 104, and thus the master gaming controller 102 (which receives information or signals from the I/O board 104 and provides information or signals to the I/O board 104). In this manner, the SCI 200 can monitor or override instructions or data provided to those components by the master gaming controller 102 and monitor or override instructions or data provided by those components and intended for the master gaming controller 102. In addition, the SCI 102 need not override instructions provided by the master gaming controller 102 or provided to the master gaming controller 102, but might monitor those instructions/data and then generate data or instructions for use in controlling or activating other components.

As illustrated, the SCI 200 is interposed between the I/O board 104 and the printer 116, the I/O board 104 and the display 112, and the I/O board 104 and the touch screen 114. The SCI 200 may be interposed between the I/O board 104 and other of the components. A first communication link C1 is provided between the SCI 200 and the I/O board 104. A second communication link C2 is provided between the SCI 200 and the printer 116. In combination, these communication links C1 and C2 permit the master gaming controller 102 to still communicate with the printer 116 through the SCI 200 (preferably as controlled or monitored by the SCI 200). In addition, however, this configuration permits the SCI 200 to communicate directly with the printer 116.

Similarly, a first communication link C3 is provided between the SCI 200 and the I/O board 104. A second communication link C4 is provided between the SCI 200 and the display 112. In combination, these communication links C3 and C4 permit the master gaming controller 102 to still communicate with the display 112 through the SCI 200 (preferably as controlled or monitored by the SCI 200). In addition, this configuration permits the SCI 200 to communicate directly with the display 112.

A first communication link C5 is provided between the SCI 200 and the I/O board 104. A second communication link C6 is provided between the SCI 200 and the touch screen 114. In combination, these communication links C5 and C6 permit the master gaming controller 102 to still communicate with the touch screen 114 though the SCI 200 (preferably as controlled or monitored by the SCI). In addition, this configuration permits the SCI 200 to communicate directly with the touch screen 114.

It will be appreciated that the communication protocols utilized between the various components and the configuration of the communication ports and links may vary dependent primarily upon the configuration of the components. For example, if the printer 116 is configured as a USB type device, a USB communication protocol and associated ports may be utilized. In other embodiments, parallel, serial or other communication protocols and configurations may be utilized. The communication links may be wired or wireless.

In one embodiment, a communication link C7 is provided between the SCI 200 and the I/O board 104. In a preferred configuration, the communication link C7 is established between the SCI 200 and a secondary SAS port of the master gaming controller 102. In particular, one common configuration for the master gaming controller 102 is to have two communication ports through which communications may be established using the SAS protocol. As indicated above, in a common gaming machine configuration, the master gaming controller 102 may communicate with the SMIB 120 via one of these ports, generally the "primary" port. In a preferred configuration, the SCI 200 is connected to the master gaming controller 102 via the secondary port.

Yet another communication link C8 is provided between the SCI 200 and at least one external device. Preferably, that device comprises at least one server 202. The SCI 200 may transmit information over this communication link C8 to the server 202 and/or receive information over this link from the server 202. It will be appreciated that the SCI 200 might be configured to communicate with more than one external device, such as more than one server or other sources of information, either via one or more communication links. In one embodiment, the server or servers 202 may include a game management system, a media management system and/or a feed of media content (such as television/cable).

In a preferred embodiment, the server or servers 202 performs validation/redemption functions. In such an embodiment, the server or servers 202 may communicate with one or more external SMIBs 203, which SMIBs 203 are in communication with the gaming system external server 122 (which may perform host accounting and/or player tracking functions, among others). The number of external SMIBs 203 may vary, such as to ensure that a sufficient number of SMIBs exist to process transactions forwarded by the SCI 200 (it is also possible for the functionality of a SMIB to instead be implemented via software running on an external device, such as software running on a remote server/processor).

It will be appreciated that the SCI 200 may communicate with one or more external devices, such as through the server 202. For example, the SCI 200 might transmit secondary game information through the server 202 to a remote website or a player's presentation device. In this manner, the SCI 200 may exchange information with external devices, including to control those devices and/or receive instructions/data from those devices.

Power may be provided to the SCI 200 from a dedicated power source or via the power source S to the gaming machine.

In this configuration, the interposition of the SCI 200 into the gaming machine does not interfere with the normal operation of the gaming machine. In particular, the gaming machine may present one or more wagering games or other events or activities to a player, as the gaming machine was originally designed. For example, in the presentation of a game, the master gaming controller 102 generates game data for display by the display 112. This data is simply transmitted to the I/O board 104 and then along communication links C3 and C4 to the display 112, through the SCI 200. Likewise, a player's touch input to the touch screen 114 is transmitted to the master gaming controller 102 via communication links C5 and C6 through the SCI 200.

In one embodiment, various features of the invention may be implemented through the SCI 200. The SCI 200 may connect to a casino server, such as casino server 24 or casino server 202. In this manner, information associated with primary and/or secondary gaming functionality which is obtained at the casino gaming machine 26 by the SCI 200 may be provided to the casino server, one or more remote servers, one or more remote computing devices or presentation devices 22. Additionally, information associated with primary and/or secondary gaming functionality obtained by the casino server from another computing device, e.g., a remote server, wager-based game publisher's server and/or presentation device 22, may be provided to the casino gaming machine 26 via SCI 200. By way of a non-limiting example, such information might comprise information regarding game play associated with the primary and or secondary game instances provided by machine 26. For simplicity sake, information regarding primary and secondary gaming functionality may be referred to herein collectively and gaming functionality information. Gaming functionality information might comprise, for example, information regarding a player input, game selections, wagers, etc., and/or output generated by the gaming machine, such as casino gaming machine 26, which information may include game display output, primary gaming functionality options, secondary game functionality options, etc.

By way of further non-limiting examples, gaming functionality information may be transmitted from a casino server 24 via a communication link to an SCI 200 of a casino gaming machine 26, thus permitting the SCI 200 to update a state, e.g., game state and/or state of play, of the casino gaming machine 26 in accordance with the gaming functionality information.

As one example, the SCI 200 may capture gaming functionality information and route such information to a casino server 24, which server may be connected to the Internet, and/or another network, may communicate with the player's presentation device 22 and/or a wager-based game provider. Similarly, the casino server 24 may receive gaming functionality information from the player's presentation device 22 and/or a wager-based game provider via the Internet, and/or another network, and forward such information to SCI 200.

A player might communicate with the SCI 200 of a casino gaming machine 26 via a casino server 24, which server 24 supports a website comprising one or more web pages for display at a presentation device 22. The website allows the player to play primary and/or secondary games provided by a particular casino gaming machine 26 by, for example, communicatively linking a computing device, such as a presentation device 22, to the selected machine in such a way as to interact with the gaming functionality provided by the selected machine. Once linked, the SCI 200 of the selected machine may provide output generated by the gaming functionality of the selected machine to a presentation device 22 being used by the player and to receive input provided by the player via the presentation device 22.

While in the preferred embodiment a player's input to a gaming machine 26 which is used to start a primary game is used to also initiate a secondary game, it is possible for a player's input at a remote presentation device 22 to be used in a similar manner. As indicated herein, a player's presentation device 22 and a casino gaming machine 26 may be linked, such as via an SCI 200 or other device/system. In one embodiment, a player might provide a "start game" input at their presentation device 22 and via that single input, a primary game may be implemented at a linked gaming machine 26 and a secondary game may also be initiated (such as presented at the player's presentation device).

SCI 200 may communicate with player tracking server 42 to provide player tracking information. As is discussed herein, user/player identification information may be provided in the course of a player's interaction with a casino gaming machine 26, which information may be communicated by SCI 200 to player tracking server 42.

As indicated herein, in one or more embodiments, aspects of a player's activities may be tracked. In one embodiment, a player's casino gaming activities may be tracked by a player tracking system, such as via the player tracking server 42. Such systems are well known in the art and are thus not described in detail herein.

Figure 2:
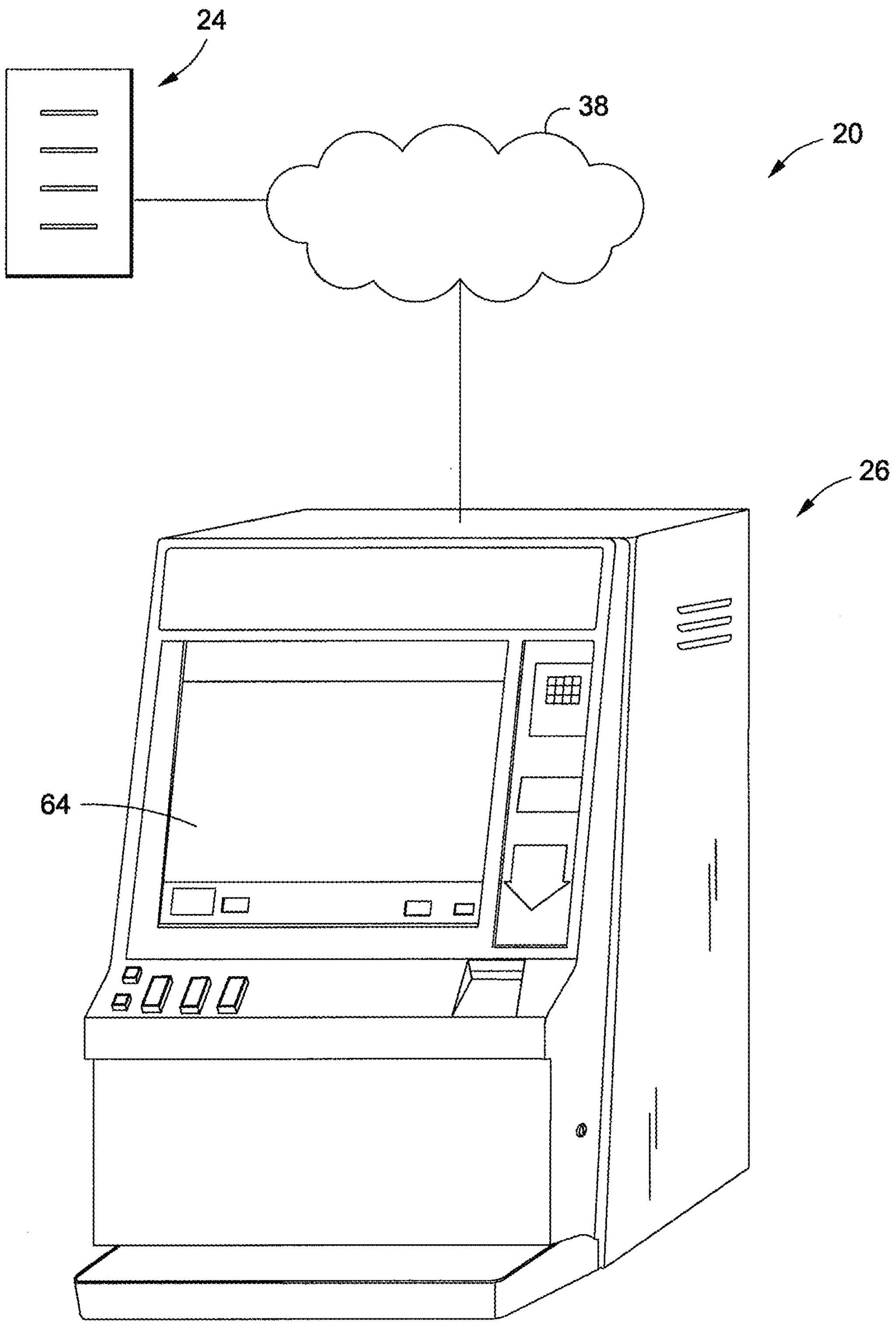
FIG. 2 diagrammatically illustrates a casino gaming machine having secondary gaming functionality.

FIG. 2 illustrates a casino gaming machine 26 having primary and secondary gaming functionality. In the example shown, display 64 of a casino gaming machine 26 may output a single-game together with one or more controls or triggers selectable by the player to enter a multi-game experience. In response to player input signaling a desire for the multi-game experience, display 64 may be modified to display multi-game output. By way of a non-limiting example, display 64 may be a touch-screen display, and the player may invoke the multi-game experience by touching a region of the display, such as by using the display 64 to touch or select a "multi-game" icon/button, etc. By way of a non-limiting example, display 64 may be used to display one or more secondary game selections, each of which may be selected by the user to indicate a desire to play a secondary game provided by a game provider or publisher. By way of a further non-limiting example, the secondary game might be a game that is provided by a wager-based game provider. The wager-based video game may be provided by a wager-based game publisher/provider, or other entity, and the game may be a game that is also available via the web, or other network, and/or that is available for play at a user's computing device, including without limitation a personal computer, mobile device, and the like.

Figure 3:
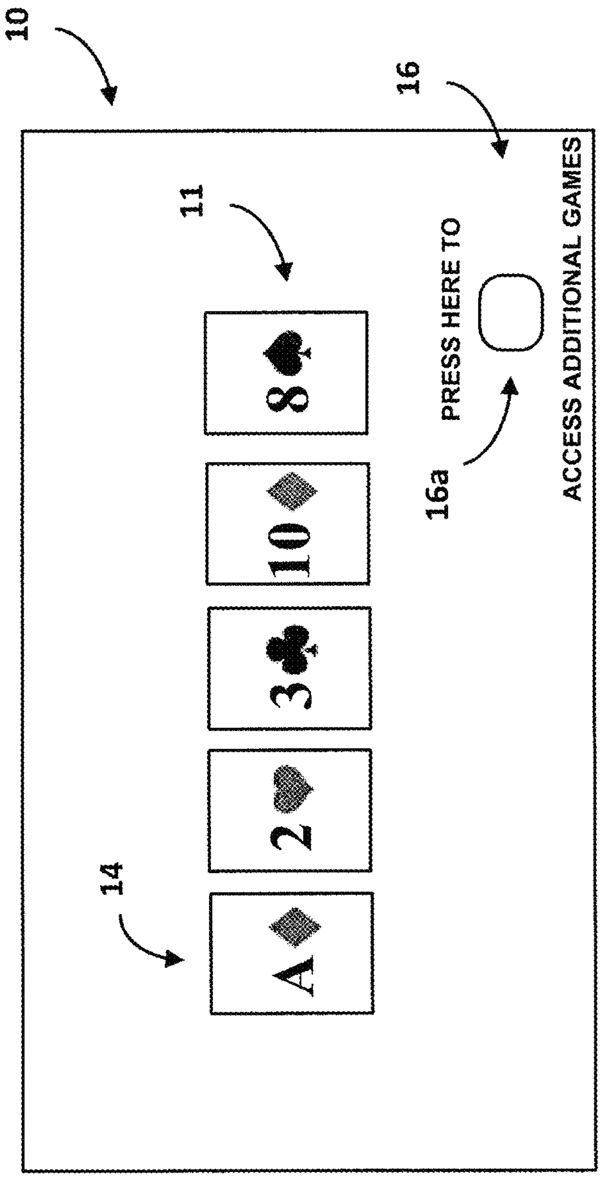
FIG. 3 diagrammatically illustrates a user interface comprising a poker primary game display and user-selectable access to secondary gaming functionality.

In accordance with one or more embodiments, a multi-game experience may be provided at the modified gaming machine 26. SCI 200 may be configured to display a multi-game user interface in response to player input. By way of one non-limiting example, the user interface may comprise multiple sections, or areas, each corresponding to a game being provided as part of the multi-game experience. FIG. 3 provides an example of a user interface 10, which may be displayed on display 64 of machine 26 in accordance with one or more embodiments. User interface 10 may display output for a primary or original game, which game may be provided via the primary gaming functionality of machine 26. In the example of FIG. 3, user interface 10 includes access 16 to additional, secondary games. Access 16 comprises a button 16*a*, which is selectable by the user.

Figure 4:
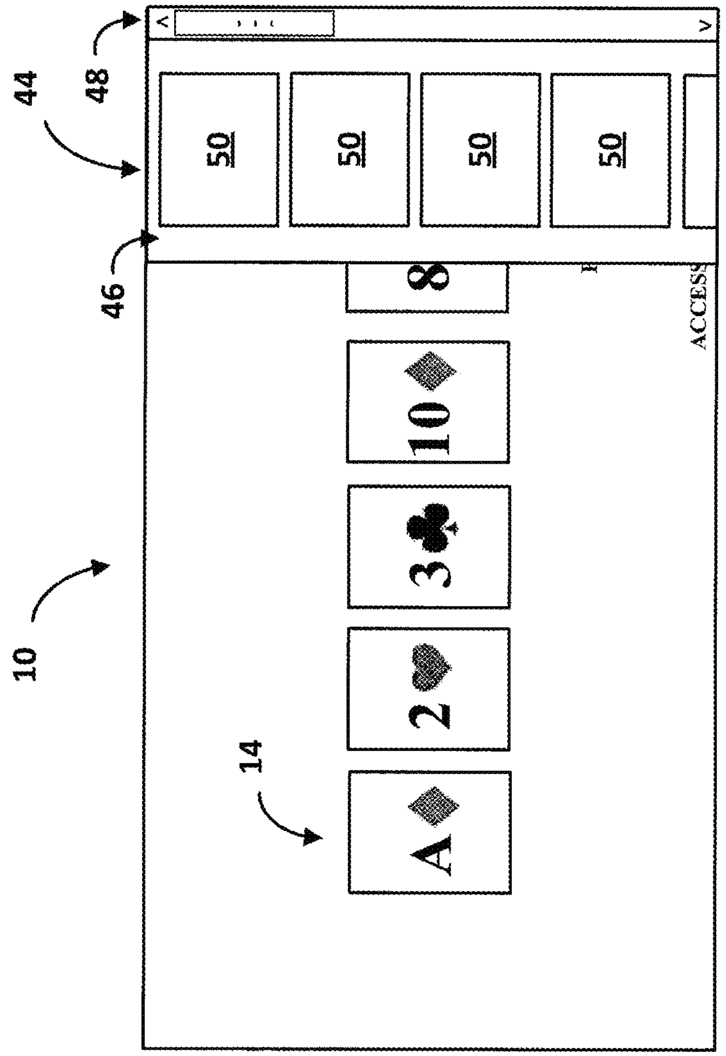
FIG. 4 diagrammatically illustrates a user interface displayed in response to user input requesting access to secondary gaming functionality.

FIG. 4 provides an example of user interface 10 displayed in response to user input requesting access to additional, secondary games in accordance with one or more embodiments. Continuing with the example provided in FIG. 3, in response to user selection of button 16*a*, menu 44 of FIG. 4 is displayed using display 64 of machine 26. In the example, menu 44 may comprise a display area 46, which may comprise one or more selectable icons 50, or other indicators, each of which represents additional wager-based games that may be played in addition to the primary game available via machine 26. In accordance with one or more embodiments, menu 44 may include a scrolling capability 48 for scrolling through the various icons 50.

As indicated herein, the one or more secondary games may be enabled or presented via the SCI 200 and/or via an external game server 24. For example, a casino may build a database of secondary games from one or more game providers and those games may be accessed via the SCI 200 associated with each gaming machine 26. This allows a casino to use existing gaming machines to present an essentially limitless number of different and ever-changing secondary games to players.

Figure 5:
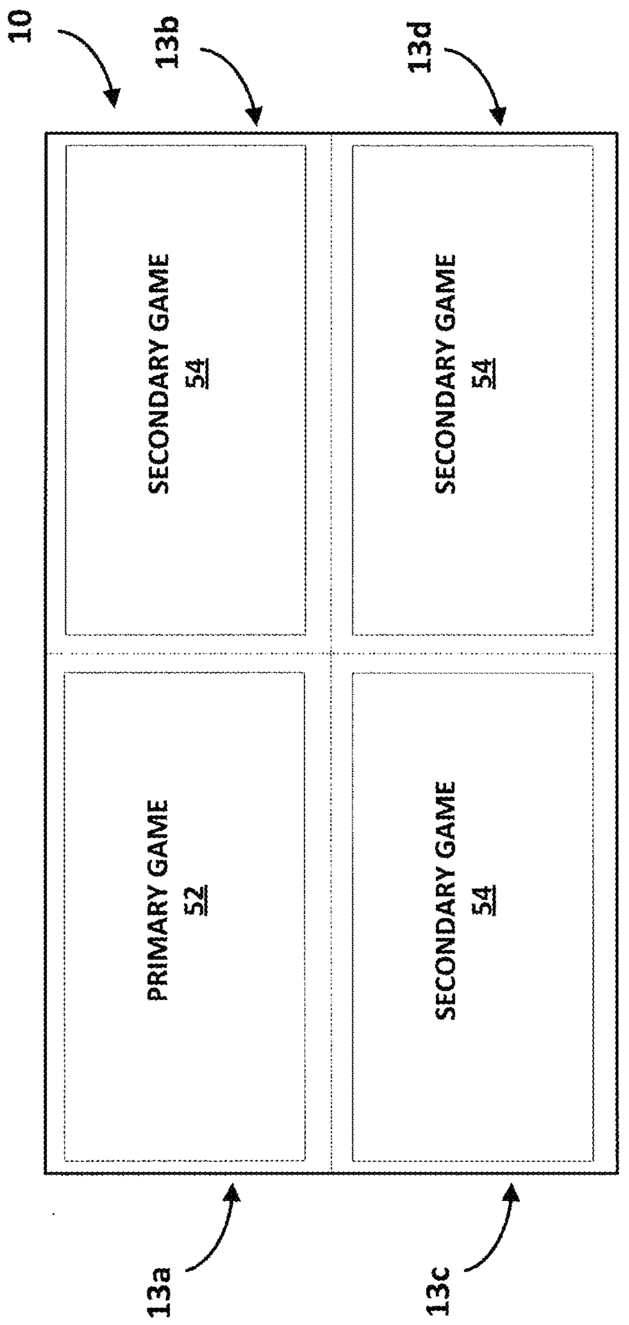
FIG. 5 diagrammatically illustrates a user interface comprising multiple sections, or areas, each of which displays a gaming instance in a multi-game experience using primary and secondary gaming functionality.

In accordance with one or more embodiments, user interface 10 may be subdivided to display output for each of the primary and secondary games. FIG. 5 provides an example of user interface 10 that includes four areas, each of which corresponds to a wager-based video game, in accordance with one or more embodiments. In the example shown in FIG. 5, user interface 10 is split into multiple sections, or areas, 13, each of which displays output for a given wager-based video game, e.g., a primary or secondary game instance. In the example, display area 13*a* may display output of a primary game 52, which may be a legacy wager-based video poker game provided by gaming machine 26, and each of secondary game areas 13*b*-13*d* may display output of a secondary wager-based video game 54 provided by a video game provider, for example.

Of course, it should be apparent that the multi-game experience shown in FIG. 5 is exemplary, and many variations are conceivable. By way of one example, the multi-game experience may comprise more or less video game display areas and/or a display area may be positioned such that some or a portion of the display areas may be overlaid or superimposed on some or all of another one or more display areas. It should be apparent that any windowing option may be used in displaying output in connection with the multi-game experience.

In accordance with one or more embodiments, a user may synchronize wagering, or betting, across all of the games instances 52 and 54. By way of a non-limiting example, the user might select a bet icon or press a wager button 74 to submit wager or bet in each of the game instances. In accordance with one or more embodiments, a single wager/bet input may provide a signal to start the primary and secondary games, e.g., the primary and secondary games may start at the same time triggered by the wager/bet input. In accordance with one or more embodiments, a multi-game experience, such as that shown in FIG. 5, provides a player with additional play possibilities simultaneously. In the example of FIG. 5, the player is given the impression of playing four separate games simultaneously.

In accordance with one or more embodiments, the player might be given an opportunity to bet in each game using a single bet input, and reach an outcome in a game in response to providing the bet input (wherein each outcome may be reached independent of the outcome of the other games and may comprise a losing outcome or a winning outcome, wherein a winning outcome may have an associate payout or winning award to the player). Where the player is given an opportunity to place a bet across all of the game instances 52 and 54, the game outcomes may be played simultaneously for all of the instances. For example, when one or more additional games, e.g., one or more instances 54, are triggered, the player may be given the option of playing the one or more additional games by placing a single wager that is made in each of the instances 52 and 54.

Figure 6:
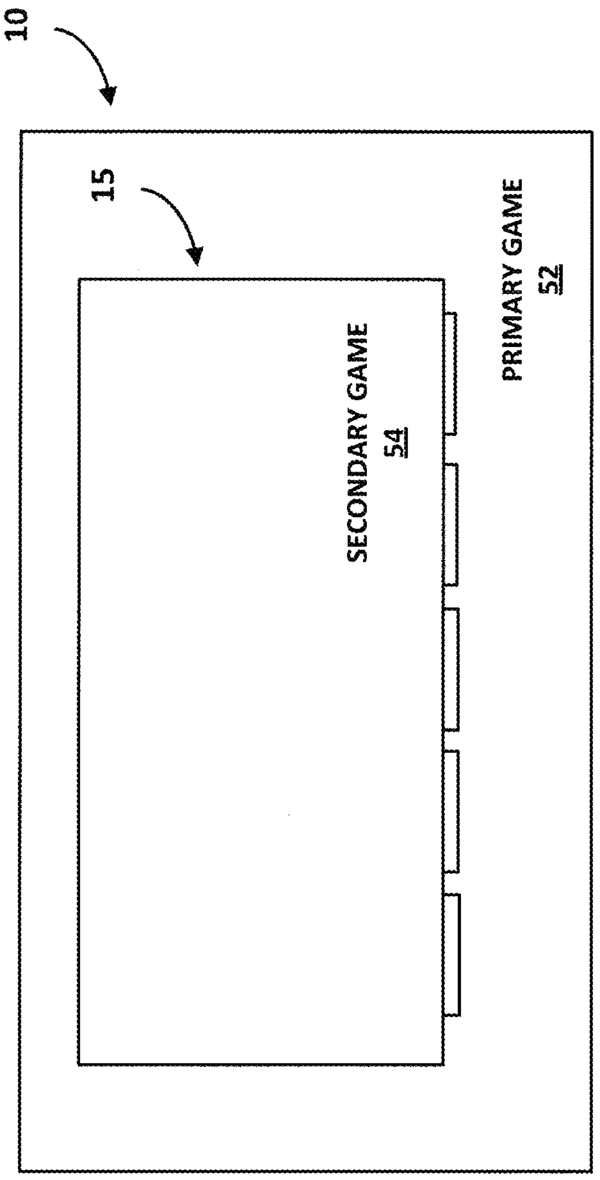
FIG. 6 diagrammatically illustrates a user interface displaying multiple game instances, one of which is superimposed on another.

FIG. 6 provides another example of a user interface 10 after the SCI 200 causes display 64 of machine 26 to display multiple wager-based video gaming output in response to user selection of at least one additional, secondary gaming instance. In the example shown in FIG. 6, an occurrence of an event, such as the player's selection of an icon 50 from menu 44 of FIG. 4 and/or wager/bet input, results in SCI 200 triggering a second game, such as wager-based video game provided by a game provider or publisher. By way of a non-limiting example, the second game may be the same or a variation of a game that the provider or publisher makes available to users over the web, e.g., at a web site or web page of the provider or publisher, and/or via a software application executable at a user's computing device. The secondary, or second, game display 15 might be overlaid, or superimposed on, the primary or original game's display in user interface 10, such as is illustrated in FIG. 6. It should be apparent that the second game's display 15 might be displayed in another location or fashion, such as without limitation alongside the original game's display, above, below, underneath, etc. the original game's display. In the preferred configuration of this embodiment, the second game does not require the player to place an additional wager to be played the second game and have the chance for additional winnings. In accordance with such a preferred configuration, the user may place a single wager for the primary and secondary games.

While in one embodiment a player may select one or more games for play by input at the gaming machine 26, it is possible for the player to select games for play via a remote device, such as a remote presentation device 22. For example, a player might use a remote computer, PDA or the like to select secondary games for play. A player's selections might be stored, for example, in a player account. When the player plays the gaming machine 26, the SCI 200 may access the stored selections so that each time a player elects to play a primary game, the one or more pre-selected secondary games are also initiated.

Of course, various criteria might be applied to the player's ability to play or select secondary games. For example, secondary games might only be available for "simultaneous" play at certain times or based upon certain criteria. As one example, a player might only be permitted to play a secondary game upon placing a maximum wager to play a primary game or the primary game and the secondary game. As another example, a player might only be permitted to play secondary game if the player has met certain game play criteria, such as levels of primary game play. Also, secondary game play might only be enabled by a casino during certain promotional events or the like.

As discussed herein, secondary gaming functionality provided via SCI 200 may involve presentation of one or more additional games, which additional games may be experienced at machine 26, or at a computing device other than machine 26 via machine 26. User interface 10 shown in FIGS. 4 and 5 might be output at a presentation device 22, for example.

The primary and secondary game could also be presented at different display devices of the gaming machine 26. For example, an existing legacy gaming machine 26 may include a plurality of spinning reels to present a primary slot game. That gaming machine may also include a video display for presenting a slot bonus game. In accordance with the invention, the primary game may comprise the slot game presented via the gaming machine reels, while the secondary game(s) may comprise video games (video slots, poker, keno, bingo, etc.) presented via or upon the video display of that same gaming machine 26 (such as via the SCI 200 interfaced with that display). The secondary game information could also be presented on different layers or windows of the same display of a gaming machine 26.

It will also be appreciated that the primary game and one or more secondary games may have the same or different features, such as the same or different pay tables, game rules or the like. As one example, the primary game may be a game of Deuces Wild video poker while the one or more secondary games may be implemented as games of Double Double Bonus video poker. In one embodiment, the one or more cards which are used in the primary game may the same or different from those used in the one or more secondary games. For example, one virtual deck of cards may be used in the play of the primary and secondary game (i.e. all cards displayed to the player in all hands are drawn or selected from a single virtual deck) or the cards in each game might be selected from different virtual decks. As another example, a primary game may comprise a slot game while the secondary game instance might comprise video or a keno game.

As discussed herein, in a multi-game experience in accordance with one or more embodiments, a single wager may be used for all of the games. In accordance with one or more embodiments, the SCI 200 might forward the bet input to the master gaming controller 102 of machine 26 for betting in connection with the primary instance 52, and the SCI 200 might track the bet for each secondary instance 54.

By way of a non-limiting example, a "double up", or other betting multiple, may be provided via the secondary gaming functionality provided by SCI 200. A player might opt to try to double, triple, etc. an amount. The actual multiple might be selectable by the player. By way of a further example, the player may opt to try to double their winnings, such as in a case that a Four-of-a-Kind ("FOK") or Royal Flush event occurs with the player's hand in the original game. By way of a further non-limiting example, where the player makes a side bet such as this, and a FOK or Royal Flush is dealt to the player, the player might win the multiple of the "pay table" amount.

As discussed herein, in one configuration the primary game and the secondary game may be entirely different and unrelated. In another configuration, the secondary game might link to or be based upon the primary game. As one example, the primary game may be a video slot game and the secondary game may be a different video slot game, e.g., an externally-sourced video slot game provided by a game publisher, and at least one symbol from the primary game is used in the secondary game. As yet another example, the primary game may be a video poker game and the secondary game may be an externally-sourced video poker game and at least one card, e.g., a hold card, from the primary game is used in the secondary game.

As yet another example, the secondary game may be a lottery game and the secondary controller may use the outcomes of one or more instances of a primary game to determine the lottery game outcome. Thus, the multi-game experience provided in accordance with one or more embodiments may comprise primary and/or secondary game instance(s) being used in combination with a lottery-type game. In accordance with one or more embodiments, the lottery-type game may be a secondary game instance. Thus, a player can play a lottery-type game in the multi-game experience, adding to the excitement of game play and also adding to the player's chances of obtaining a winning outcome.

In accordance with one or more such embodiments, the primary and/or secondary game instance(s) may enable a lottery-type game, in a manner such as, for example, that disclosed in U.S. Application Ser. No. 61/703,914, entitled Lottery-Type Game Based Upon Casino Games, filed on Oct. 15, 2012, which is incorporated herein by reference.

In traditional lottery games a player picks or is provided a set of numbers from a larger set of numbers. A set of game numbers is then randomly selected from that same set of numbers. If the player's numbers match the game numbers, then the player is declared to be the winner.

In accordance with one or more embodiments, the lottery game is played in connection with one or more other wager-based video games, e.g., keno, video poker, slot, etc. There is a set or pool of "numbers", which may comprise actual numbers, cards, slot symbols, etc. that may be used in each of the one or more other wager-based video games. Prior to the start of play of the other wager-based video games, the player may make picks or selections from the set of numbers to create the player's set of "numbers" to play with in the lottery game. A set of lottery numbers may be picked based on play in the one or more other wager-based video games and compared to the player's picks to determine the outcome of the lottery-based game. As described in more detail below in some non-limiting examples, the lottery picks might be the game numbers selected in one or more keno game instances, or the lottery picks might be cards dealt in a hand in each of one or more poker game instances, for example.

In accordance with one or more embodiments, each wager-based video game that is played with the lottery-type game may comprise any type of two wager-based video game made available via embodiments of the present invention.

By way of a further non-limiting example, the one or more other wager-based video games played along with the lottery-type game might be one or more instances of a keno game, which one or more instances may be a primary game provided by the legacy gaming machine 26 and/or a secondary instance provided via SCI 200; the lottery-type game might be a primary game or a secondary game. The player selects a set of player numbers to play the lottery-type game. The lottery numbers are picked from the numbers generated for the keno instance(s). If the player's numbers are matched with the lottery numbers picked for the keno game instance (s), the player is awarded a lottery-type award. Such an award may be a progressive jackpot. Each keno game instance is independently presented and the outcome of each game is also determined.

In accordance with an embodiment, as discussed above, the player is a winner of the lottery-type game if all of the player's selected numbers are matched by the game numbers for the keno game instance(s). In a most preferred embodiment, the player's numbers must be matched in sequence with the selected game numbers for each game. Thus, as one aspect of the invention, when a player selects a set of player numbers, the player's selections are preferably designated in a sequence or order. In addition, the game numbers are drawn or selected for the set of lottery numbers in a particular sequence. If the player's numbers are matched in sequence to the set of lottery numbers (or on a position-by-position basis), then the player is declared to be a winner of the lottery-type game.

By way of another non-limiting example, the game instance enabling the lottery-type game might be one or more video poker game instances; e.g., the primary game and/or the secondary game might comprise a wager-based video poker game, and a primary or secondary game instance might comprise the lottery-type game. A player selects a set of cards from the set of cards from which cards are dealt for a hand in each one of the one or more video poker game instance(s) to be the player's set of numbers for playing the lottery-type game. The player then plays each video poker game instance. If the player achieves a winning hand in a video poker game, then the player may be awarded winnings for the winning outcome(s). In addition, if the player's selected cards are matched by the cards which are dealt to the player in the play of the video poker game instance(s), preferably in the exact same sequence, the player is awarded a lottery-type award. By way of some non-limiting examples, in accordance with at least one embodiment, the player is a winner of the lottery-type game if all of the player's selected cards are matched by the cards which are dealt in the video poker game instance(s). In a most preferred embodiment of the invention, the player's selected cards must be matched in sequence with the cards which are dealt to the player for each game instance.

In accordance with one or more embodiments, SCI 200 may track wagers and credits associated with each secondary game instance. Information identifying a player's wagers and credits for one or more of the secondary game instances may be forwarded by SCI 200 to an external data store. By way of a non-limiting example, the external data store for a given wager-based video game might be maintained by the provider of the game. By way of a further non-limiting example, the external data store might store wager/credit information for wager-based video games provided by different providers, such as in a centralized data store. In any case, the wager/credit information stored in an external data store may be used by a player via legacy machine 26 or another legacy machine 26, and the wager/credit information may be used by the player playing a game instance at a computing device other than a legacy gaming machine 26, e.g., a mobile device or other computing device.

In this regard, different credits or the like may be used and tracked relative to play of primary and secondary games. For example, primary games may be played with monetary credits which are tracked by the controller of the gaming machine 26. Secondary games might be played using other monetary credits, secondary credits, or even monetary or non-monetary value points or the like (in this regard, it is possible for the secondary game(s) to be other than wager-based games, such as games which are played with non-monetary points or the like, such as where points are wagered for the chance to win monies, points or even prizes). For example, a player might input funds (a value ticket, cash, coins, etc.) to the gaming machine 26 to register primary credits for use in playing primary games. A player might place funds into a player account (such as tracked via the casino accounting server 40), which credits can be accessed and tracked via the SCI 200 to play secondary games. Also, a player might instead wager and win points or the like relative to secondary games.

The player may designate wager amounts of play of primary and secondary games. Such may be accomplished, for example, via an on-screen menu. When the player provides a game play or wager input to the game machine, the appropriate wagers are lodged. For example, upon such a single player input, the player may wager 5 monetary credits upon a primary game (which may be tracked by the gaming machine 26) and may wager 2 points or 2 secondary credits upon a secondary game (which wager may be tracked by the SCI 200). In this manner, the wagers on the secondary games are tracked without interfering with the primary game functionality and accounting. In such a configuration, a player might be awarded secondary credits or points (even on a promotional basis) which the player could access and use at any modified gaming machine.

As discussed herein in connection with one or more embodiments, secondary gaming functionality provided using SCI 200 may involve providing at least a portion of a multi-game experience using a social media system, server-based gaming system, another gaming machine 26, to a player's presentation device, etc. In accordance with one or more embodiments, SCI 200 may connect with a social media server directly or indirectly to provide secondary gaming information to the social media server. By way of a non-limiting example, secondary gaming information may comprise game content, information identifying one or more seed cards, wagering information, etc. By way of a further non-limiting example, some or all of the secondary gaming information might be used to share at least a portion of a player's multi-game experience with the player's social media friends. In some embodiments of the invention, the player's "friends" may participate in the secondary game and/or make decisions which relate to the player's play of the secondary game. Likewise, information or content which is generated externally, such as at a social media server, may be provided to the gaming machine 26. For example, information about the multi-game experience shared with the player's social media friends may be transmitted from a social media server to the SCI 200 of the gaming machine 26, thus permitting that information to be utilized at, and/or displayed by, the gaming machine 26.

In a case that a server-based gaming system is used in providing at least some portion of a multi-game experience, SCI 200 may connect with a system server directly or indirectly to provide secondary gaming information, e.g., game content, seed card information, wagering information, etc., to the server. By way of a further non-limiting example, some or all of the secondary gaming information might be used by the server-based system to provide at least a portion of a player's multi-game experience at a presentation device 22. Likewise, information or content which is generated externally, such as at a system server, may be provided to the gaming machine 26. For example, information about the multi-game experience provided by the server-based system may be transmitted from a system server to the SCI 200 of the gaming machine 26, thus permitting that information to be utilized at, and/or displayed by, the gaming machine 26.

Figure 8:
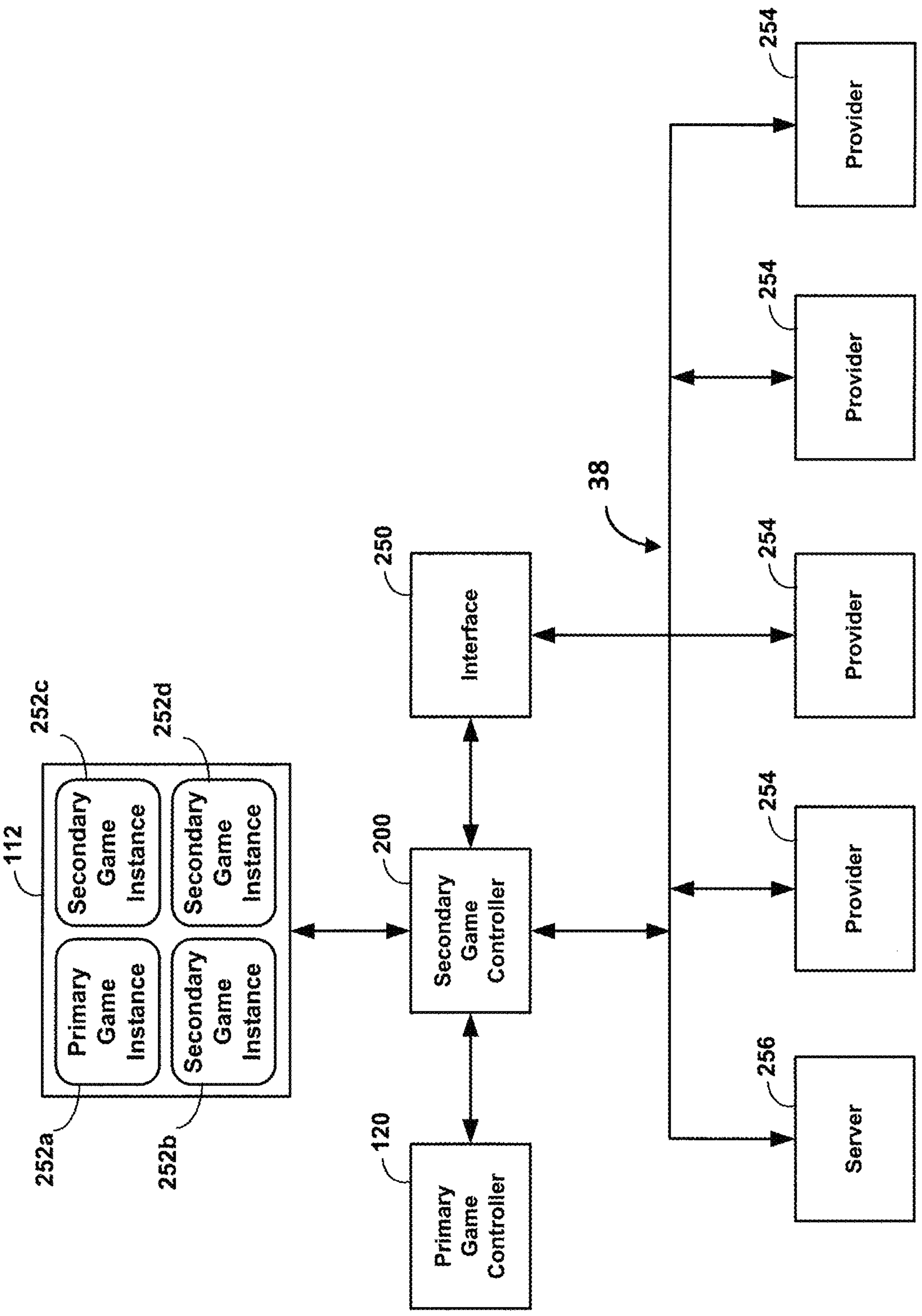
FIG. 8 diagrammatically illustrates communication between components of a gaming system and external components using an interface.

As discussed herein in accordance with one or more embodiments, SCI 200 provides secondary functionality comprising wager-based video games from various game providers, or externally-sourced wager based video games, which games may be available in some form to a player via the web and/or as an application executable on the player's computing device. In accordance with one or more embodiments, an externally-sourced wager-based video game might be provided for use with a machine 26 via SCI 200 and an interface component coupled to SCI 200. FIG. 8 diagrammatically illustrates communication between components of a gaming system and external components using an interface 250. Interface 250 may comprise hardware and/or software. In accordance with one or more embodiments, interface 250 of FIG. 8 may comprise an application programming interface (API) that may be used by a provider 254 to configure SCI 200 to implement an externally-sourced wager-based video game from a provider 254 game content on machine 26. By way of a further non-limiting example, interface 250 may be used to communicate wager/credit information from SCI 200 to server 250 and/or provider 254, and vice versa. Server 256 may be an accounting, social media, gaming, player tracking, casino, etc. server, for example.

In the example of FIG. 8, SCI 200 is in communication with primary game controller 102 as discussed herein in accordance with one or more embodiments. In the example, the primary game controller 102 is coupled to display 112 via SCI 200; however, it should be apparent that primary controller 102 may also be able to communicate directly with display 112. In any case, display 112 may be configured via primary controller 102 and secondary controller 200 to display multiple game instances, with the primary game controller 102 being configured to provide primary game instance 252*a* and secondary game controller, or SCI, being configured to provide secondary game instances 252*b*-252*d*. In the example shown in FIG. 8, display 112 displays output for the primary game instance 252*a* and the three secondary game instances 252*b*-252*d*.

In the example shown in FIG. 8 and discussed herein, a modified gaming machine 26, and in particular the SCI 200, may communicate with one or more external devices, some or all of which may be remote with respect to the machine 26, via one or more network, including without limitation network 38 shown in FIG. 1. The one or more external devices might be one or more server computers of providers 254, which server computers are in communication with SCI 200 via network 38 and interface 250.

In an embodiment, network 38 may couple devices so that communications may be exchanged, such as between servers 24, 40 and 42, casino gaming machine 26, presentation devices 22, server 256, a server computer of provider 254 and/or other types of devices, including between wireless devices coupled via a wireless network, for example. Network 38 may include the Internet, one or more local area networks (LANs), one or more wide area networks (WANs), wire-line type connections, wireless type connections, or any combination thereof.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

As indicated herein, the features of the invention may be implemented at legacy gaming machines which offer various games, including video poker, video slots or various other games now known or later developed. For example, relative to a legacy game of video slots, secondary functionality may be added which allows a player to play additional wager-based video games, such as without limitation video slots other than the legacy slot game(s), wager-based poker, keno, lottery-type, etc. video games. It is also noted that the one or more secondary games could comprise a wide range of other games. For example, as detailed herein, the secondary games could comprise prize-winning games such as entertainment-based games. It is also possible for the secondary games to comprise table games such as roulette, craps or the like, where data or information regarding the table game may be converted to data which can be presented at the gaming machine 26 or a user's presentation device, or which might comprise video of the secondary game or the like.

While in a preferred embodiment the invention is implemented in the manner described above, aspects of the invention could be implemented in various other manners. For example, in one embodiment instead of interposing a secondary controller between the processor/controller of an existing legacy gaming machine and one or more of its peripherals, a secondary controller could be directly associated with the primary controller, such as to directly communicate therewith. In one embodiment, a secondary controller or similar device might be used to simply monitor the output of a primary gaming machine 26. As one example, an existing legacy gaming machine 26 may have one or more output ports which output game play information. A secondary controller might be used to simply monitor those outputs, such as to detect a "primary game start" input or state, player inputs or other actions at the gaming machine, in order to present a secondary game. As one example, upon detection of such an output, a secondary controller (associated with the gaming machine 26 or a group of gaming machines) could simultaneously initiate a secondary game at a player's presentation device 22. In such a configuration, the secondary controller does not need to be interposed in the gaming machine 26 but the outputs or actions at the gaming machine can simply be externally monitored; yet, as a result of a player initiating a primary game at the gaming machine, that input/action causes the automatic initiation or presentation of a secondary game to the player, such as via their presentation device).

One advantage of the present invention is that an existing or legacy gaming machine which is configured to present one or more primary games can be modified so that one or more secondary games other than the primary games can be presented at or via that machine. In a preferred embodiment, although the gaming machine was only configured with primary gaming functionality, both the primary and secondary games can be initiated seamlessly via one single player input at the gaming machine. For example, once a player has selected one or more secondary games, each time a player provides a designated input to the gaming machine to play a primary game, the one or more secondary games may be initiated or presented without additional or separate input. In this manner, game implementation is greatly simplified for the player and the modified gaming machine operates very similar to a gaming machine that is custom-configured in its base form to present multiple games.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A modified gaming machine, comprising:

a housing;

a master gaming controller;

a plurality of gaming machine peripherals communicating with said master gaming controller via one or more communication links;

said master gaming controller configured to present a main game based upon a first monetary value payment; and a secondary hardware controller added to the gaming machine, said secondary hardware controller in communication with one or more of said communication links, said secondary hardware controller configured to present a secondary gaming activity at a device of a player of said gaming machine, said secondary gaming activity comprising at least one of a modified version of said main game, a bonus game or event, and a game which is different than said main game.

2. The modified gaming machine in accordance with claim 1, wherein said plurality of gaming machine peripherals comprises at least one video display.

3. The modified gaming machine in accordance with claim 1, wherein said secondary hardware controller communicates with a remote game server which provides information to said secondary hardware controller for use in presenting said secondary gaming activity.

4. The modified gaming machine in accordance with claim 1, wherein said secondary hardware controller receives one or more secondary game inputs from said device of said player of said gaming machine and utilizes said one or more secondary game inputs in the presentation of said at least one secondary gaming activity.

5. The modified gaming machine in accordance with claim 1, wherein said secondary hardware controller is configured to present said at least one secondary gaming activity based upon a secondary monetary value payment by a player to said secondary hardware controller, wherein said master gaming controller implements a primary credit meter of primary credits and said first monetary value payment to play said main game comprises a wager of one or more of said primary credits and said secondary hardware controller implements a secondary credit meter of secondary credits and said second monetary value payment to said secondary hardware controller comprises a wager of one or more of said secondary credits.

6. The modified gaming machine in accordance with claim 1, wherein said secondary gaming activity is selected by said player of said gaming machine from a set of secondary gaming activities.

7. A modified gaming machine comprising:

a housing;

a master gaming controller;

a plurality of gaming machine peripherals communicating with said master gaming controller via one or more communication links;

said master gaming controller configured to present a main game based upon a first monetary value payment; and a secondary hardware controller added to the gaming machine, said secondary hardware controller in communication with one or more of said communication links, said secondary hardware controller configured to cause said gaming machine to present secondary game content at a device of a player of said gaming machine, said secondary game content comprising at least one of a modified version of said main game, a bonus game or event, and a game which is different than said main game;

wherein said master gaming controller implements a primary credit meter of primary credits and said first monetary value payment to play said main game comprises a wager of one or more of said primary credits and said secondary hardware controller implements a secondary credit meter of secondary credits.

8. The modified gaming machine in accordance with claim 7, wherein said secondary hardware controller is configured to present said secondary game content based upon a secondary monetary value payment by said player to said secondary hardware controller and said second monetary value payment to said secondary hardware controller comprises a wager of one or more of said secondary credits.

9. The modified gaming machine in accordance with claim 7, wherein said primary credits comprise monetary value credits and said secondary credits comprise one or more of monetary value credits, non-monetary value credits and points.

10. The modified gaming machine in accordance with claim 7, wherein a balance of said primary credit meter and/or a balance of said secondary credit meter is displayed to said player via at least one of a video display of said gaming machine and said device of said player.

11. The modified gaming machine in accordance with claim 7, wherein said primary credits and said secondary credits have different values.

12. A modified gaming machine comprising:

a housing;

a master gaming controller;

a plurality of gaming machine peripherals communicating with said master gaming controller via one or more communication links;

said master gaming controller configured to present a main game based upon a first monetary value payment, said main game offering one or more base awards for winning outcomes of said main game; and a secondary hardware controller added to the gaming machine, said secondary hardware controller in communication with one or more of said communication links and a mobile device of a player of said modified gaming machine, said secondary hardware controller configured to cause said gaming machine to present at least one secondary game at said mobile device of said player, where said secondary game comprises at least one of a modified version of said main game, a bonus game or event, and a game which is different than said main game, and at least one aspect of said at least one secondary game is dependent upon information received from said mobile device of said player.

13. The modified gaming machine in accordance with claim 12, wherein said information determines the at least one secondary game presented by said secondary hardware controller.

14. The modified gaming machine in accordance with claim 13, wherein said information comprises information regarding one or more games presented by said mobile device of said player.

15. The modified gaming machine in accordance with claim 14, wherein said information regarding one or more games comprises information regarding at least one playing card or game symbol.

16. The modified gaming machine in accordance with claim 13, wherein said at least one secondary game comprises a secondary game presented in addition to said main game to create a multi-game experience.

* * * * *